June 9, 1925.
W. S. PIERCE, JR
1,541,526
VEHICLE SUSPENSION
Filed April 19, 1921    2 Sheets-Sheet 1
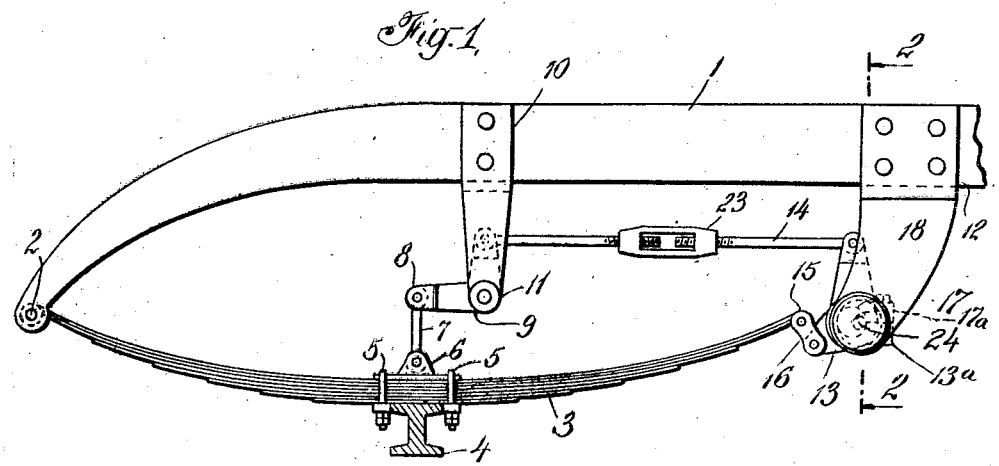
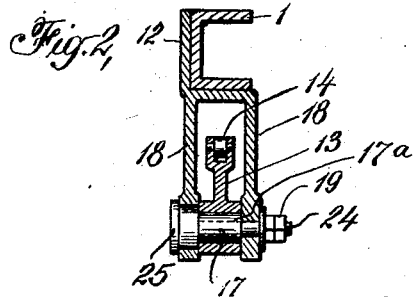
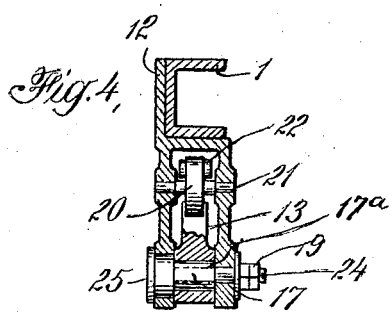
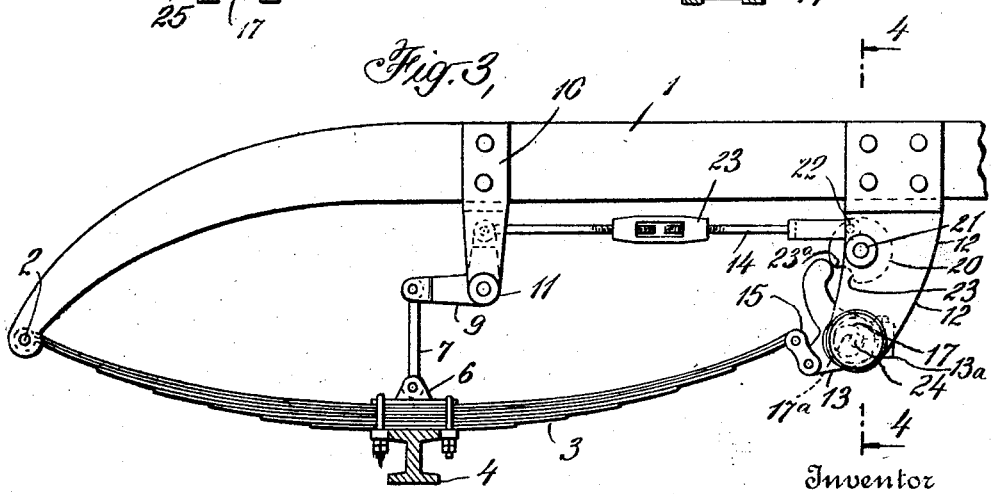

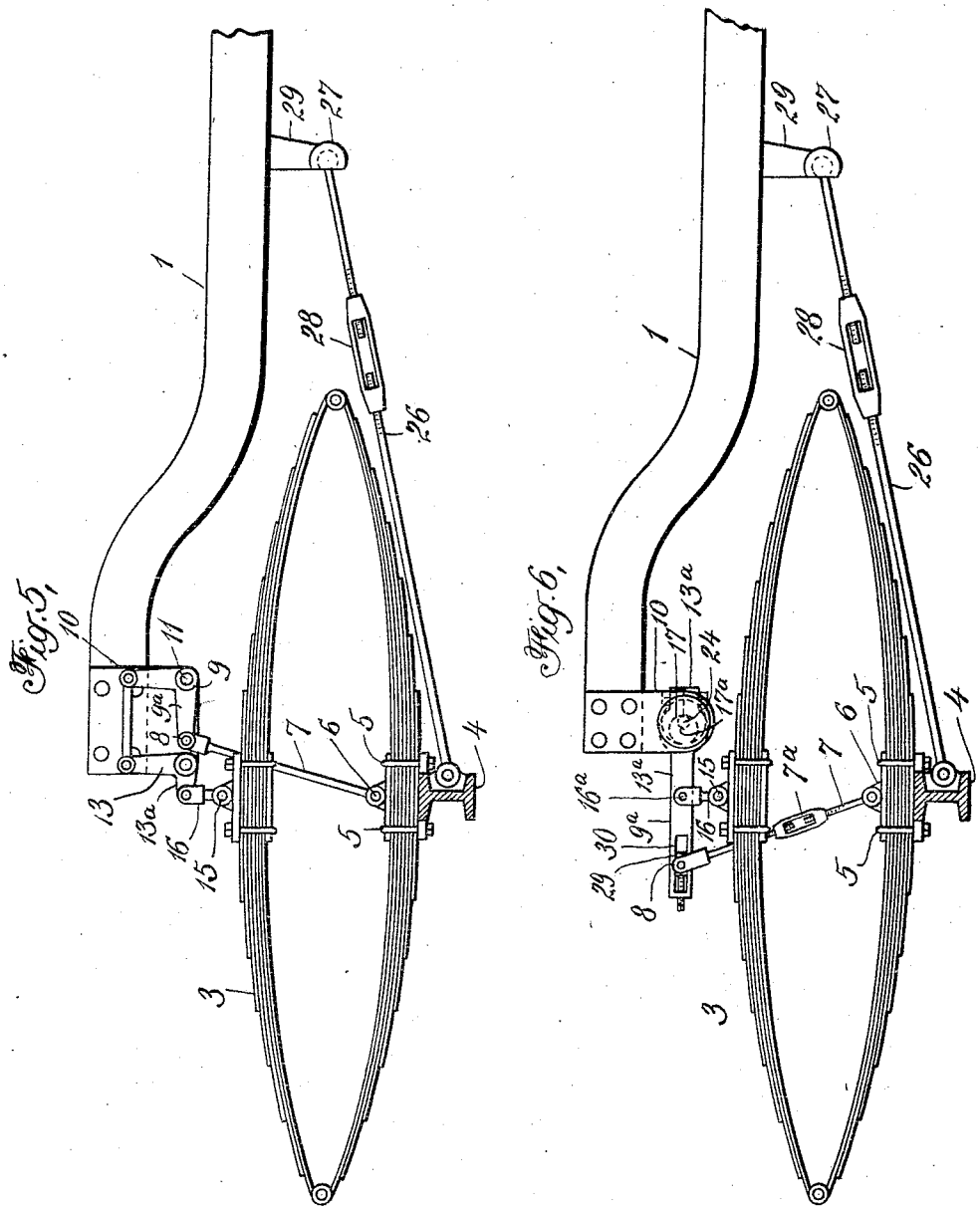

Patented June 9, 1925.

1,541,526

UNITED STATES PATENT OFFICE.

WINSLOW S. PIERCE, JR., OF BAYVILLE, NEW YORK.

VEHICLE SUSPENSION.

Application filed April 19, 1921. Serial No. 462,553.

*To all whom it may concern:*

Be it known that I, WINSLOW S. PIERCE, Jr., a citizen of the United States, residing at Bayville, in the county of Nassau, State of New York, have invented certain new and useful Improvements in Vehicle Suspensions; and I do hereby declare the following to be a full, clear, and exact description of the invention, such as will enable others skilled in the art to which it appertains to make and use the same.

The present invention relates to a suspension for vehicles and involves a form of construction rendering it particularly suited to automobiles for improving their riding qualities.

In various devices heretofore contrived for enhancing the riding qualities of automobiles, such for example as the full elliptic, the cantilever, the three-quarter platform springs, and the Westinghouse air spring, the governing principle in their design and operation has been to secure a maximum travel of the axle relatively to the chassis frame for a given increase of spring tension. Compared with a semi-elliptic spring having both its ends pivotally secured to the chassis frame, the movement of the axle relatively to the frame for a given spring tension with the full elliptic and cantilever springs is approximately twice as great; with the three-quarter platform about one and one-half times as great, and in the case of the Westinghouse air spring, the increase in the travel of the axle can be made to vary with the pressure adjustment. While in all of these types of devices the travel of the axle is increased and the riding of the automobile consequently made smoother, where a spring is employed as in the full elliptic, cantilever and three-quarter platform suspensions, a tension is set up above the initial tension due to the weight of the car which is greatly in excess of that necessary to restore the spring to normal, thus causing a shock to be transmitted to the body of the vehicle when an irregularity in the road is encountered.

The present invention has for an object the provision of a vehicle suspension so constructed as to secure a lengthened travel of the axle relatively to the frame, accompanied at the same time by a minimum increase in spring tension. In carrying out this object, the invention comprehends as one of its parts a suspension of the type comprising a resilient member mounted on the axle and connected to the frame, the latter having on the resilient member a point of suspension movable with the axle relatively to the frame. The suspension includes in its construction connecting means between the point of suspension and the axle which is constructed and arranged to restrain the movement of the point of suspension to less than the normal unrestrained movement thereof relative to the movement of the axle.

In one form of construction the resilient member, mounted on the axle, is pivotally connected to the frame, the axle preferably having movable connection with the latter; and the means connecting the point of suspension and the resilient member are constructed and arranged so as to reduce the movement of the point of suspension through an arc centering on the pivotal point to less than its arc from the same center proportional to that through which the axle moves. The movement of the point of suspension thus being arrested so that its travel in an arc about the pivotal point of the resilient member is less than the arc proportional to that through which the axle moves, an increase in tension is set up which is sufficient to restore the resilient member to normal position. It has heretofore been pointed out that a small increase in tension will suffice to restore the resilient member to its normal position and therefore the reduction in travel of the point of suspension as described to produce the increased tension need be only a slight amount. The means, therefore, connecting a point on the resilient member with the point of suspension is, in accordance with the invention, made adjustable to vary its set, and to regulate the reduction in travel and the consequent increase in tension. Means for effecting this adjustment of tension increase is of the highest importance in the practical application of a vehicle suspension of the type to which the invention relates, and in its successful operation.

Irrespective of the movements of the axle and the point of suspension in arcs about the pivotal point of the resilient member, the parts may be so constructed and arranged that the point of suspension is movable with the axle relatively to the frame, and in co-relation to the movement of the axle, whereby to reduce the proportional increase of tension set up by movements of the axle and resilient member relatively to the frame.

The resilient member may consist of a spring, and the means for reducing the movement of the point of suspension relatively to the axle may comprise a lever connected to the point of suspension, a second lever mounted on the frame and connected to a point on the spring, and a connecting rod between the levers.

Furthermore, the means connecting the point of suspension and the resilient member may consist of bell cranks, one of which is pivoted to a bracket secured at one point on the frame and the other to a second bracket secured at another point on the frame. In this construction, one arm of each of the bell crank levers is connected together by means of a connecting rod and the other arms connected respectively to the axle and the end of the spring. In the specific embodiment of the invention described hereinafter, the bell crank lever, which has one of its arms connected to the end of the spring, is eccentrically pivoted in its bracket and is secured in different eccentric positions on the pivot by means of an eccentric hub and a lock nut.

The invention comprehends as another of its parts the provision of means for absorbing extreme shocks such as would ordinarily subject the passengers of an automobile to a severe jolt, and possibly drive the axle of the car against the frame with the resulting danger of injury to the parts. In this arrangement, the suspension comprises a resilient member mounted on the axle and pivotally connected to the frame, the frame having on the resilient member a point of suspension movable with the axle relatively to the frame, and means connecting the point of suspension with a point on the resilient member which is constructed and arranged first to reduce the movement of the point of suspension through an arc centering at the pivotal point to less than its arc from the same center proportional to that through which the axle moves, and finally to reverse the movement of the point of suspension relatively to the axle. Thus, during the initial period of depression of the resilient member, the movement of the point of suspension in its arc about the pivotal point is reduced below the arc from the same center proportional to that through which the axle moves to create an increase in tension, in accordance with the arrangement described with reference to the first part of my invention; but while the axle is still traveling toward the frame, due to an unusually large depression, the direction of movement of the point of suspension is finally reversed. This action is reversely repeated while the resilient member is being restored to its normal position. In this form of construction, the means connecting the resilient member and the point of suspension is likewise made adjustable to vary the travel and set the latter.

In the specific form of such means described hereinafter the bell crank lever having one arm connected to the spring is in engagement through the other arm thereof with a cam interposed between the two bell crank levers, the cam being connected by means of a connecting rod with the bell crank lever which has one arm connected to the axle.

It will be understood that in the different forms of my invention described hereinbefore, the chassis frame might have at both ends of the resilient member points of suspension movable with the axle relatively to the frame. In this construction the means connecting the points of suspension with a point on the resilient member are constructed and arranged to reduce the movement of the points of suspension relatively to the axle.

The preferred embodiment of the invention is illustrated in the accompanying drawings, in which Fig. 1 is a view in elevation of the suspension;

Fig. 2 is a detail sectional view along the line 2—2 of Fig. 1;

Fig. 3 is a modified form of the suspension;

Fig. 4 is a sectional detail view along the line 4—4 of Fig. 3;

Fig. 5 is a view in elevation of a further modification showing the application of the suspension to a full-elliptic spring; and Fig. 6 is a modification of the suspension shown in Fig. 5.

Referring to Fig. 1, the chassis frame of the vehicle is represented at 1, and pivotally connected to the end of the frame at 2 is a semi-elliptical leaf spring 3. The spring is secured to the axle 4 of the vehicle about midway between its ends by means of clamps 5. Directly above the axle 4, and also secured by clamps 5 is a bracket plate 6 pivoted in which is one end of a rod 7, the other end of which has pivotal connection at 8 with a bell crank lever 9. Above and to one side of the axle 4 is a bracket 10 which is bolted to the frame 1 and serves to provide at its end a pivotal mounting at 11 for the bell crank lever 9. Situated at a point beyond the end of the spring and bolted to the frame 1 is a bracket 12 in which is pivotally mounted a bell crank lever 13, one arm of which is connected to the bell crank lever 9 by means of a connecting rod 14, and the other arm being connected with an end 15 of the spring 3 through shackle 16.

The effective lengths of the arms of bell crank lever 13 are made adjustable to provide for a greater or less travel of the point of suspension relatively to the frame by eccentrically mounting the bell crank lever on the shaft 24 between the sides 18 of the bracket 12. For this purpose the bell crank lever 13 is provided with a hub 17 fitted to rotate therein, having an eccentric bearing 17$^a$, and through which, together with the sides 18 of the bracket 12, the shaft 24 passes. The shaft 24 is locked against movement relatively to the sides 18 of the bracket 12, by means of lock nuts 19 threaded on one end of the shaft 24, the latter being provided at its other end with a head 25 bearing against one of the sides of the bracket. The hub 17 is adjustably held against rotation in the bell crank lever 13 by the clamp 13$^a$ and is rotatable on the shaft 24 at the eccentric bearing 17$^a$. Adjustments of the bell crank lever 13 in different positions on the hub 17 are made by manipulating the clamp 13$^a$.

In the modified form of the invention illustrated in Fig. 3, a cam wheel 20 is pivoted at 21 in the bracket 12, and connected eccentrically as at 22 with an arm of the bell crank lever 9 through connecting rod 14. One arm of the bell crank lever 13 is formed to co-act with the cam surfaces 23 and 23$^a$ on the periphery of the cam wheel 20, and the other arm is connected to the end of the spring.

In both the forms illustrated in Figs. 1 and 3 the connecting rod 14 consists of two parts, the end of which are threaded and joined together by a turn buckle 23 for the purpose of adjustment to the normal set of the spring.

With respect to the operation of the suspension illustrated in Fig. 1, when an irregularity in the road is encountered such as will raise the axle toward the frame 1, the spring 3 will move with the axle toward the frame, but the end thereof which is pivoted to the bell crank lever 13 will travel toward the frame in an arc about the pivotal point 2, an amount less than the proportional arm from the same pivotal point through which the axle moves depending upon the leverage of the means connecting the point on the spring above the axle with the movable end of the spring. When the axle 4 reaches the limit of its movement toward the frame 1 the spring, having been constrained to move a less amount, will be depressed to set up a tension therein only sufficient to restore it to its normal position.

With respect to the operation of the suspension illustrated in Fig. 3, when the axle 4 is forced toward the frame 1 by an irregularity in the road, the spring travels with the axle, and likewise the end thereof, or point of suspension 15, during the initial period of depression. During this period the arm of bell crank lever 13, in engagement with the cam 20, is in contact with the declining cam surface 23$^a$, the movement of the axle 4 being transmitted to the cam 20, to cause its rotation, through the bell crank lever 9 and connecting rods 7 and 14. Continued movement of the axle toward the frame as in the case of an extreme shock causes the rotation of the cam 20 to bring the arm of the bell crank lever 13 in engagement with the cam, into engagement with the inclined cam surface 23. This results in the bell crank lever 13 being rotated in the reverse direction, or counter-clockwise, and in consequence the point of suspension 15 is moved away from the frame 1 or in a direction the reverse of the movement during the initial period of depression. A tension is therefore set up in the spring which resists the continued movement of the axle toward the frame and tends to restore the spring to normal. It will be evident that during the return movement of the axle to its normal position the arm of the bell crank lever 13 in engagement with the cam 20, being in contact with the cam surface 23 causes the point of suspension to move toward the frame, thus reducing the tension of the spring, and finally the point of suspension will again be depressed when the arm of the bell crank lever assumes its initial position on the outer extremity of the cam surface 23$^a$.

Referring to Figs. 5 and 6, the suspension is shown applied to a full-elliptic spring 3. In the construction illustrated in Fig. 5, the means connecting the point of suspension 15 with a point on the spring 3 above the axle 4 includes two bell crank levers 9 and 13 mounted on a bracket 10 secured to the frame 1, similar to the corresponding parts in the constructions illustrated in Figs. 1 to 4, inclusive. As indicated in the drawing, the arm 13$^a$ of bell crank 13 is of a length less than the remainder of the arms of bell cranks 13 and 9 so that the upward travel of the point of suspension 15 will be less than the upward travel of the axle 4 by an amount depending upon the ratio of these arms. Assuming the arm 13$^a$ of bell crank 13 to be half the length of the arm 9$^a$ of bell crank 9, the distance through which point of suspension 15 would move for a given depression would be half that of the axle 4.

The connecting means between the point of suspension 15 and the point on the resilient member above the axle 4 may be simplified, as shown in Fig. 6, by eliminating the bell crank levers 9 and 13 and substituting therefor a single lever pivotally connected at 16$^a$ with the shackle or connection 16 connecting the lever with the point of suspension 15 on the upper half of the spring.

In this form the travel of the point of suspension 15 relatively to the axle 4 will be in the ratio of the lever arms $9^a$ and $13^a$. The effective length of the lever arm $9^a$ may be varied by an adjustable sliding connection with the connecting rod 7, this connection consisting of a slot 30 in the lever arm $9^a$ having an adjustable slide 29 therein to which the connecting rod 7 is pivoted at 8. The connecting rod 7 is provided with a turn buckle $7^a$ so that its length may be varied in accordance with the adjustment of the sliding connection and the initial set of the spring. The lever may furthermore be adjusted in different positions by means of the eccentric connection with the bracket 10, which is constructed and operates like the corresponding part in Figs. 1 to 4 inclusive.

In both the constructions illustrated in Figs. 5 and 6, the axle 4 is rigidly connected to the frame by means of a radius rod 26 having a turn buckle 28 therein, which is pivotally connected at 27 to a bracket 29 secured to the frame. The operation of these forms of the suspension will be understood from the description of the operation of the forms illustrated in Figs. 1 to 4, inclusive.

I claim:

1. The combination with a vehicle having a chassis frame and axle, of a suspension comprising a resilient member mounted on the axle and pivotally connected to the frame, the frame having on the resilient member a point of suspension movable with the axle relatively to the frame, and means connecting the point of suspension with a point on the resilient member which is constructed and arranged first to reduce the movement of the point of suspension through an arc centering at the pivotal point to less than its arc from the same center proportional to that through which the axle moves, and finally to reverse the movement of the point of suspension relatively to the axle.

2. The combination with a vehicle having a chassis frame and axle, of a suspension comprising a resilient member mounted on the axle and pivotally connected to the frame, the frame having on the resilient member a point of suspension movable with the axle relative to the frame, and in co-relation to the movement of the axle, first in the same and finally in reverse direction to the axle, whereby first to reduce and then to increase the proportional increase of spring tension set up by movements of the axle and spring relatively to the frame.

3. The combination with a vehicle having a chassis frame and axle, of a suspension comprising a resilient member mounted on the axle, the frame having on the resilient member a point of suspension movable with the axle relatively to the frame, and in co-relation to the movement of the axle, first in the same and finally in the reverse direction to the axle, whereby first to reduce and then to increase the proportional increase of spring tension set up by movements of the axle and spring relatively to the frame.

In testimony whereof I affix my signature

WINSLOW S. PIERCE, Jr.